(12) United States Patent
MacLeod

(10) Patent No.: US 7,783,110 B2
(45) Date of Patent: Aug. 24, 2010

(54) SEMICOHERENT CHANNEL ESTIMATOR

(75) Inventor: Robert B MacLeod, Nashua, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 1144 days.

(21) Appl. No.: 11/400,922

(22) Filed: Apr. 10, 2006

(65) Prior Publication Data

US 2007/0047676 A1   Mar. 1, 2007

Related U.S. Application Data

(63) Continuation-in-part of application No. 11/293,700, filed on Dec. 1, 2005, now abandoned.

(60) Provisional application No. 60/632,097, filed on Dec. 1, 2004.

(51) Int. Cl.
   *G06K 9/46* (2006.01)
(52) U.S. Cl. .................. 382/190; 375/341; 342/195; 342/204
(58) Field of Classification Search ............. 375/341; 342/104, 99, 89, 109, 204; 382/190
   See application file for complete search history.

(56) References Cited

U.S. PATENT DOCUMENTS

| | | | |
|---|---|---|---|
| 4,633,427 A | 12/1986 | Bocker | |
| 5,486,833 A * | 1/1996 | Barrett | 342/204 |
| 5,617,099 A | 4/1997 | Warren et al. | |
| 6,018,312 A | 1/2000 | Haworth | |
| 6,618,009 B2 | 9/2003 | Griffin et al. | |
| 6,636,174 B2 * | 10/2003 | Arikan et al. | 342/195 |
| 6,839,026 B2 | 1/2005 | Baugh et al. | |
| 2004/0042531 A1 | 3/2004 | Arikan et al. | |
| 2005/0002445 A1 | 1/2005 | Dunyak et al. | |

FOREIGN PATENT DOCUMENTS

EP   0422479 A2   4/1991

OTHER PUBLICATIONS

Guey et al :"Diversity waveform sets for Delay-Doppler imaging", IEEE, Info. Theory, vol. 44, No. 4, 1998.*
Sun et al: "Adaptive spectrogram for Time-frequency signal analysis", IEEE, 1996.*
Griffiths, H.D. et al, "Denial of bistatic hosting by spatial-temporal waveform design", IEE Proc-Radar Sonar Navig., Apr. 2005, pp. 81-88, vol. 152, No. 2.

* cited by examiner

*Primary Examiner*—Samir A. Ahmed
*Assistant Examiner*—Ruiping Li
(74) *Attorney, Agent, or Firm*—Vern Maine & Associates

(57) ABSTRACT

One embodiment is a system for processing a complex ambiguity function (CAF) comprising creating a CAF surface from incoming data and a model vector, wherein the CAF surface has at least one feature, processing for a peak value, establishing a sub-window about the peak, wherein the peak is within the sub-window, and flattening the peak.

20 Claims, 7 Drawing Sheets

SEMICOHERENT CHANNEL ESTIMATOR

RELATED APPLICATIONS

This application is a Continuation-in-Part of U.S. patent application Ser. No. 11/293,700 filed Dec. 1, 2005 which claims the benefit of U.S. Provisional Applications No. 60/632,097, filed Dec. 1, 2004. These applications are incorporated in their entirety by reference.

FIELD OF THE INVENTION

The present invention relates to a system and processing utilizing the cross ambiguity function (CAF).

BACKGROUND OF THE INVENTION

The ambiguity function is used to examine different waveforms or signals which include unknown signals, extraneous noise, and various reflections, and to extract signal or target information wherein the information signals have a certain degree of accuracy and reliability. The cross-ambiguity function (CAF) is typically used to locate some type of "signal" which has certain unknown parameters, and various types of parameterization can be employed and match a model to processed data.

A common use of the CAF is in relation to sonar and radar applications to locate signals having unknown time delay and frequency offset (Doppler shift). The ambiguity functions can be used to estimate the range and velocity of "targets" and, more generally, of the cross-ambiguity function to estimate target distribution functions.

For example, radar operations provide a two-dimensional function of radar range and Doppler frequency determined by the transmitted waveform. The reception of the radar signals includes not only the reflected transmitted waveform but also associated noise and other signals. The principles of radar processing are well-established as described in Nathanson, F. E., 1991: *Radar Design Principles,* 2d ed., McGraw-Hill, 360-369; and Skolnik, M. I., 1980: *Introduction to Radar Systems,* 2d ed., McGraw-Hill, 411-420.

For example, if a signal, s(t), is transmitted and returns with additive noise, r(t), the time delay (T) corresponds to range and the Doppler shift corresponds to target velocity. A three-dimensional CAF surface is generated as a grid of points and characterized by time, frequency and amplitude. Provided that the Doppler effect can be approximated by a frequency shift, the presence of a target is indicated by a prominent peak in the CAF surface. Determining the actual CAF peak generally requires certain interpolation techniques.

The CAF procedure also applies to signals in domains other than time delay and frequency offset. For example, CAF processing is used in communications, optics, imaging, audio and medical applications.

In communications applications, wired or wireless networks are employed for communication between various devices, such as cell phones and computers. Typically, digitally modulated signals are transmitted between nodes of a network.

One example is satellite communications networks where terminals transmit through satellite transponders, terrestrial systems where terminals transmit through repeating towers, and indoor local area networks where terminals transmit through central repeating elements. Locating the source of an unknown signal involving satellite communications is described in U.S. Pat. No. 6,018,312 wherein the receiver coherently processes received signals including reference signals. CAF processing of the reference and unknown signals determine the relative differential time offset (DTO) and differential frequency offset (DFO) which is used to calculate the position of the unknown source.

Another example relates to the computer elements connected to networks that provide a variety of user services. Examples include telephone traffic with digital voice encoding, video conferencing, wide area computer network connectivity, and internet service. In such applications, it is desirable to maximize the network traffic capacity in a given bandwidth in the presence of interference and noise.

Various schemes are used to enhance efficiency and transfer more traffic within a designated bandwidth, however there are inherent inefficiencies due to sufficient signal to noise ratio or coding redundancy. More communicators could use an allocated bandwidth provided there were some means for detecting the excess signal margin, as well as a means for demodulating signals in the presence of interference. In general, despite advancements in transmission and reception, conventional systems do not properly account for the real world wired and wireless communication signals that suffer from signal degradation such as interference and multipath problems.

More specifically, a real world multiuser system includes a number of independent users simultaneously transmitting signals. Each of these transmissions is associated with real-time problems of multipath and co-channel interference that manifest in the received signals. Multipath occurs when a signal proceeds to the receiver along not one but many paths so that the receiver encounters signals having different and randomly varying delays and amplitudes. Co-channel interference refers to signals received from other users.

A multiuser detection (MUD) receiver can be used to jointly demodulate co-channel interfering digital signals. MUD generally refers to the detection of data in non-orthogonal multiplexes. MUD processing increases the number of information bits available per chip or signaling dimension for interference limited systems. Optimal MUD based on the maximum likelihood principle operates by comparing the received signal with the entire number of possibilities that may have occurred at the ensemble of transmitters, to give rise to the waveform received at the receiver.

However, for multiuser detectors that examine a larger capacity of signals, the computations are complex and time-consuming, thus making real-time operation impractical. Reduced complexity approaches based on conventional tree-pruning algorithms help to some extent. However, performance of such multiuser detection algorithms degrades as the parameter M (pruning factor) is decreased, but M governs the number of computations required. Thus, to combat improper pruning, basic tree-pruning must ensure that M is large enough. As a result, conventional pruning methods are still associated with increased complexity, particularly when the number of interfering signals is moderate to large.

There are a variety of methods for low complexity estimation of channel parameters in a communications system. Typically, these methods involve maximum likelihood searches (either exhaustive or directed) of the parameter space, which as used herein is the channel impulse response, and Doppler offset.

The use of such existing methods for a low complexity estimation of channel parameters, however, may involve prohibitive computational complexity for computing fully coherent or optimal solutions to parameter estimation problems based on CAF surfaces. The processing may require more time, more hardware and more sophisticated software systems. Thus, there exists a need for a low complexity method for estimation of channel parameters in a communications system.

SUMMARY OF THE INVENTION

One embodiment of the present invention includes a method for processing a complex ambiguity function (CAF) surface comprising creating a CAF surface from incoming data and a model vector, wherein the CAF surface has at least one feature, processing for a peak on the CAF surface, establishing a sub-window about the peak, wherein the peak is within the sub-window, and flattening the peak. Other embodiments include processing for a next peak, establishing a next sub-window about the next peak, and flattening the next peak. According to certain embodiments, the processing continues until a condition is satisfied according to one of a group consisting of constant false alarm processing, setting a margin level, and setting a customizable level.

According to one embodiment, flattening is a flattening function defined by performing an autocorrelation of the model vector and inversing the autocorrelation. The flattening, in a further embodiment, is a flattening function, wherein computation of the flattening function further comprises centering the peak in the sub-window, performing an autocorrelation function, and inverting the feature. Another variation provides wherein the flattening is represented by: $f(\tau,f)=1-\int h^H(\tau_0, f_0) h(\tau, f)$.

In one embodiment, the sub-window is a range about the feature such that the sub-window includes sufficient pixels to represent an entire autocorrelation function. The sub-window can also be represented as: $h^H(\tau_0, f_0) h(\tau, f)$, wherein: $h(\tau, f)$ represents a neighborhood.

According to one embodiment, the feature contains a plurality of two dimensional pixels having some time delay and frequency offset.

The peak, in one embodiment, occupies at least one pixel and represents an area on the CAF surface of increased amplitude.

An embodiment of the present invention provides a system for processing a complex ambiguity function (CAF) surface comprising generating a pixel array CAF surface from incoming data wherein the CAF surface has at least one feature and at least one peak, finding a least one pixel representing the at least one peak on the CAF surface, wherein the peak has an amplitude greater than a background level, framing a sub-window around the peak, wherein the sub-window includes the peak, and applying a flattening function to the feature in the sub-window.

The system, according to another embodiment, provides wherein the flattening function cancels at least one peak in the sub-window and wherein there can be multiple peaks that can be simultaneously cancelled.

Yet a further embodiment includes wherein the flattening function is represented as: flattening function=(1−autocorrelation).

In another embodiment the sub-window is sized so that pixel values along an edge or all the edges of the autocorrelation function are about approximately zero.

One embodiment of the present invention is a method for high resolution processing, comprising computing a CAF surface of an array of pixels at a desired over-sampling rate, locating a peak on the CAF surface, forming a sub-window about the peak, multiplicatively removing the peak using fractional delays, and repeating the steps of locating a next peak and multiplicatively removing each next peak.

Another embodiment includes wherein the peak is calculated by at least one of a matched filter section and a maximum likelihood estimation (MLE) section.

A further embodiment provides wherein the CAF surface is computed at the desired over-sampling rate by CAF (w, T)=$r^H*S(w, T)$.

In another embodiment a size of the sub-window is selected from a group consisting of fixing a reference signal to a reference point, empirical testing so the sub-window extends past a coherence time and a Doppler extent, using apriori knowledge so the sub-window extends past a coherence time and a Doppler extent, warping the window to ensure it encompasses a sufficient region, and using apriori information about a canonical shape for some range of values.

According to one embodiment, the present invention relates to a method of low complexity estimation of channel parameters which is accomplished by selective coherent and incoherent processing of a complex cross ambiguity surface (CAF) to detect training signals. Incoherently cancelling out the peaks is a further aspect of the invention.

One embodiment of the invention is a method for processing a complex cross ambiguity surface (CAF) comprising creating a CAF surface from incoming data wherein the CAF surface has at least one feature, processing the data for a peak value, establishing a window about the peak value, wherein the peak value is within the feature, and flattening the feature.

Other aspects include processing for a next peak value, establishing a window about the next peak value in a next feature, and flattening the next feature. Another feature relates to removing repeating features. A further aspect includes establishing the window about the feature.

There is a brute force way to coherently process the signals which is computationally intensive and requires significant processing requirements and time for such processing. The coherent processing computes the CAF and finds the signal; it reconstructs the signal; it then subtracts off the data. Finally, it then computes a new CAF; it then finds the next signal and continues processing. One of the unique features of the present invention is the incoherently canceling out the peaks of the CAF surface, without re-computing the surface.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

The present invention is further described with reference to the accompanying drawings wherein.

DETAILED DESCRIPTION

The present invention describes methods and embodiments for cross ambiguity function (CAF) or complex cross ambiguity function (CCAF) based processing to get channel estimates. While described primarily in relation to communications, the same technology is equally applicable to other signal processing environments such as radar, sonar, and military applications that require an efficient mechanism to process multiple signals.

The described embodiments are just an illustration of the digital processing technique that is applicable to many variations and applications all within the scope of the invention. A description of multiuser processing for various embodiments is detailed in the commonly assigned patents and patent applications including U.S. Pat. No. 6,947,506 titled Method and Apparatus for Improved Turbo Multiuser Detector; U.S. Pat. No. 6,831,574 titled Multi-Turbo Multi-User Detector; and U.S. Pat. No. 6,704,376 titled Power and Confidence Ordered Low Complexity Soft TurboMUD with Voting System; U.S. Published Patent No. 2003/0204808 titled Method and Apparatus for Random Shuffled Turbo Multiuser Detector; and 2003/0138035 titled Voting System for Improving the Performance of Single-User Decoders within an Iterative Multi-User Detection System; all of which are incorporated herein by reference for all purposes.

Figure 1:
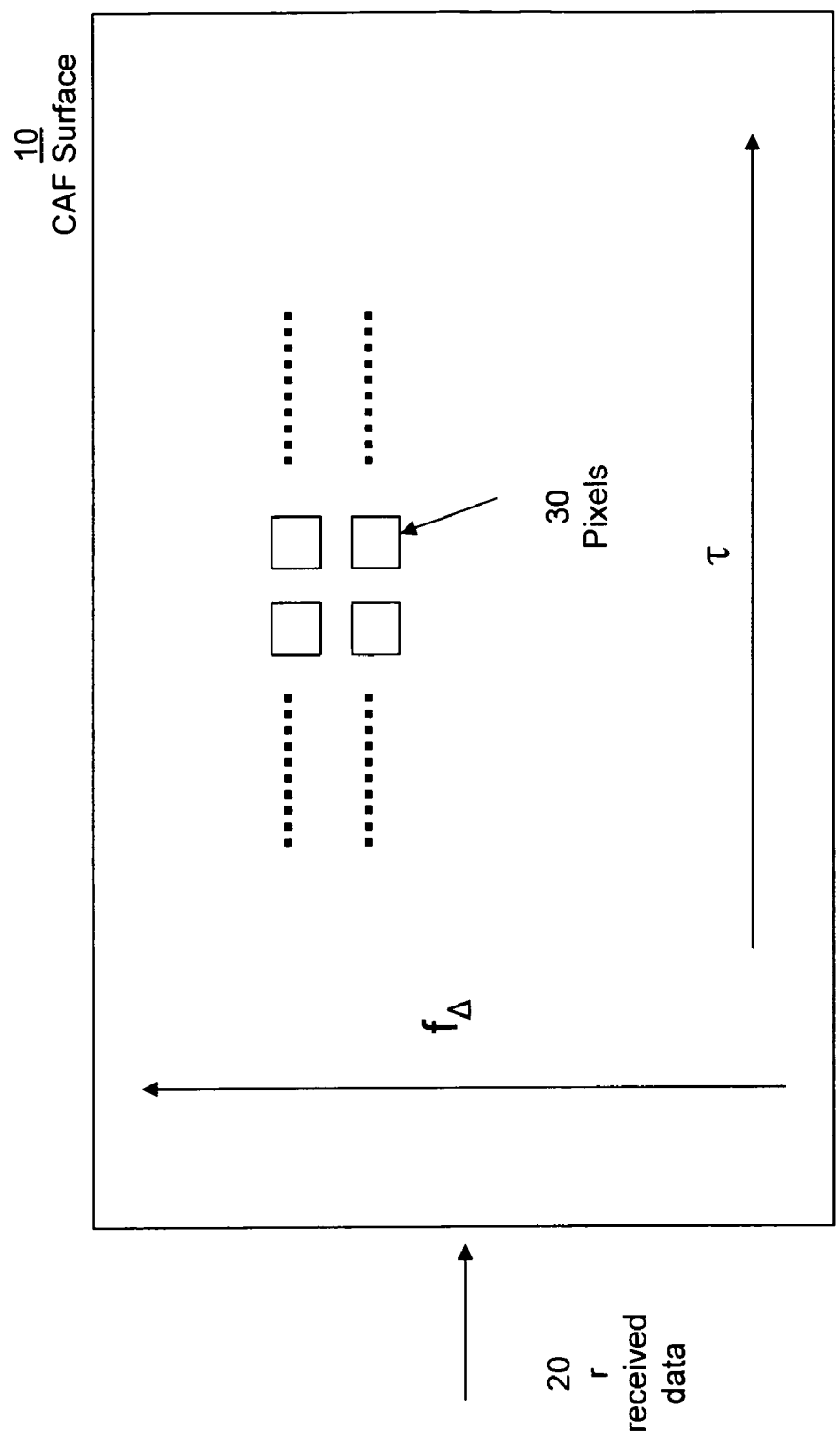
FIG. 1 is an illustration of a CAF surface showing the elements in accordance with one embodiment of the invention.

FIG. 1 depicts a large cross ambiguity function (CAF) sometimes termed a complex cross ambiguity function (CCAF) surface with a plurality of pixels 30. For illustrative purposes, the CAF surface 10 shall be explained in terms of frequency and time delay, however it should be understood that this is not to be deemed as restricting the present invention. In this example, this CAF surface 10 could represent 1000×1000 pixels, although more typically this would be a few hundred in the y axis (frequency) and a few thousand in the x axis (time delay). Each pixel 30 represents the correlation of a signal you are looking for to the received data 20. The processing computes this correlation for each pixel 30 at that frequency and time delay, and determines how well it matches the data. Represented as an image, each correlation is complex, but by taking the absolute value, an image can be displayed. For illustrative purposes, it typically resembles a mountain range with various features that indicate the location of the signals. It should be understood that the drawing is not to scale.

Referring again to FIG. 1, the CAF surface 10 is generally described as follows. There is some received data r 20 which is processed to generate an array of complex numbers. The other input for the surface is a model vector (h), wherein h can be a function of time delay and frequency offset. When you compute the surface 10 using a collection of time delay and frequency offset values, the surface is pixilated, with a plurality of pixels 30 in two dimensions. The value of each pixel 30 (normalized or not) is an inner product of data with the model vector which can be expressed as $r^H h(\tau_i f \Delta_j)$. Both the magnitude and phase of these potentially complex numbers convey information to subsequent processing, but to display as an image, the magnitudes are typically used.

Figure 2:
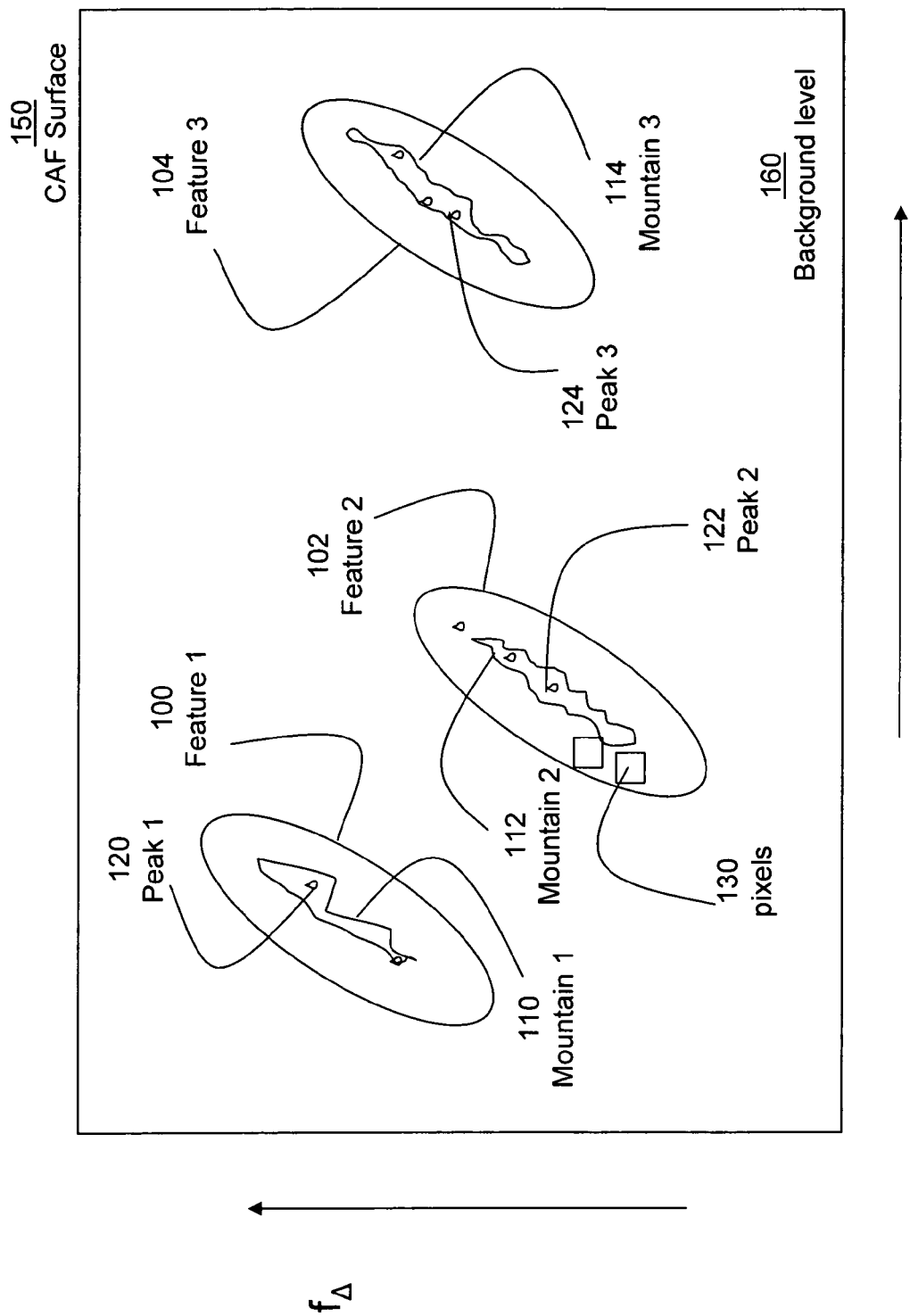
FIG. 2 shows multiple features according to one embodiment of the present invention.

FIG. 2 shows three signals on the CAF surface 150 which correspond to the three features 100, 102, 104 which represent some area with an amplitude that is above the noise floor or background level 160. In this illustration, these signals are linear FM signals and the aspects or "mountain" 110, 112, 114 moves in both time delay and frequency and have a further increase in amplitude. For each mountain 110, 112, 114 there will be some highest point or peak 120, 122, 124. The peak 120, 122, 124 may not typically culminate at one particular pixel 130 but may be spread out over several pixels 130 depending upon the type of signal the characteristics/shape of the mountain 110, 112, 114. Though the mountain 110, 112, 114 is shown elongated it can be any size/shape and there will be some highest point 120, 122, 124 above the background level 160 for each feature 100, 102, 104. The term feature 100, 102, 104 as used herein shall refer to any size/shape of a target wherein the edges of the signal or target may be approximately equal to the background level 160. The term mountain 110, 112, 114 as used herein shall refer to the shaped structure that culminates at some peak value 120, 122, 124 and has portions rising above the background level 160. Once again, the drawing is not to scale.

Referring again to FIG. 2, a typical CAF surface 150 will have several features 100, 102, 104 that have some time delays and frequency offsets where signals are present. These features 100, 102, 104 are manifested by areas on the CAF surface 150 of increased amplitude when contrasted with the general background level of the surface 160. This example is a linear FM model, however this is employed for illustrative purposes only and is not to be construed as limiting in any fashion. These features 100, 102, 104 for this illustration have mountain or elevated areas 110, 112, 114 with corresponding peaks 120, 122, 124 that show the location of the signals. It should be understood that the use of features 100, 102, 104 is used in a general sense to indicate some shape having a height or peak, and each feature typically consists of a collection of several tens to several hundreds of pixels 130 that make up the features 100, 102, 104. The various elements noted herein are for illustrative purposes and not drawn to scale.

The standard estimation procedure used in the art to identify the signals is to try to find the maximum value of the peaks and identify some corresponding frequency offset and time delay associated with the peak value. Thus state of the art systems locate the biggest peak within the image and identify its frequency offset and time delay to identify the received signals represented in the image. This is typically done by taking the entire image and finding the maximum value which would then be used to identify the frequency offset and time delay. This requires supporting hardware resources and lengthy computation time.

Furthermore, there are problems that arise when you have multiple features 100, 102, 104 on the CAF surface 150. As described herein, there are a plurality of pixels 130 within each feature 100, 102, 104, each having an amplitude above the background level of the surface 160. In some instances, one feature, for example feature 2 102 can be much higher than the surrounding but separate features 100, 104, and it is possible to have several peak values 122 from that feature 102 as well as other high values from the same feature 102 that may be higher in value than the peak values 120, 124 of the other features 100, 104. Processing these signals based on the highest level or amplitude may result in errors.

According to one embodiment, the processing locates each of the peak values 120, 122, 124 in each of the features 100, 102, 104 in order to locate the corresponding signal for each of one or more users.

Referring again to FIG. 2, assume that each feature 100, 102, 104 has 50 pixels and that there is a much higher peak value 122 on one of the features 102 such that several of the pixels 130 also in that feature 102 are higher than the peak values 120, 124 of the other features 100, 104. In the prior systems that only select the highest values from an image, these systems would typically be unable to properly process and separate the incoming signals. While methods have been devised in order to alleviate this problem, the processing iteratively removes the values as they are estimated, and this iterative removal approach is computationally challenging since an entire CAF surface is recomputed at each iteration.

It should be readily understood that the features can be represented in many other formats such as a two-dimensional depiction with CAF magnitude in the y axis and frequency in the x axis, and even CAF magnitude in the y axis and time delay in the x axis. In such a presentation, there would be some noise floor representative of the background level and certain levels would have a higher CAF magnitude representing the features and signals of interest.

Figure 3A:
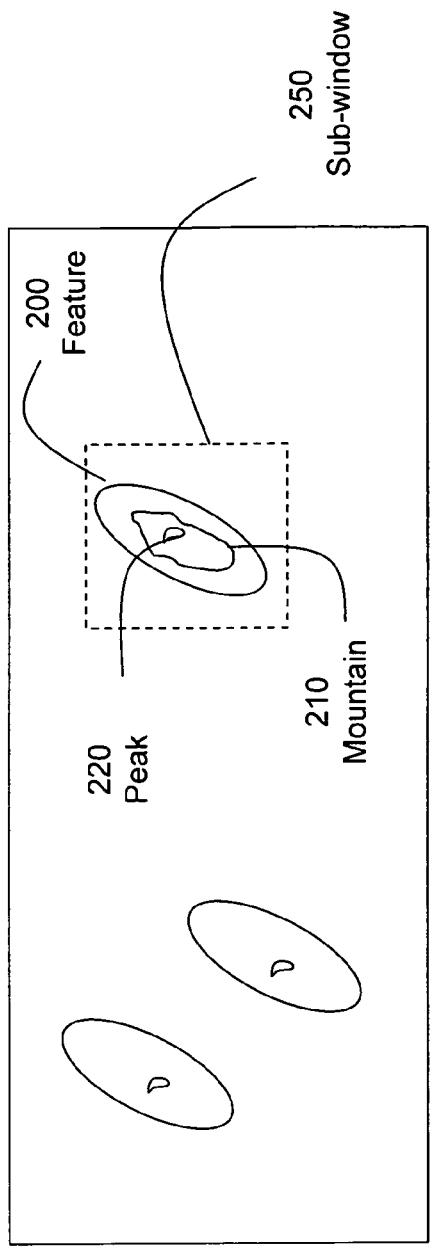
FIG. 3a shows the placement of a window about a feature according to one embodiment of the present invention.

FIG. 3a shows a sub-window 250 around one of the features 200, wherein the data within this sub-window 250 is examined in closer detail. As described herein, the size of the sub-window 250 is sufficient to capture the feature 200 yet small enough to keep the processing requirements sufficiently low.

Figure 3B:
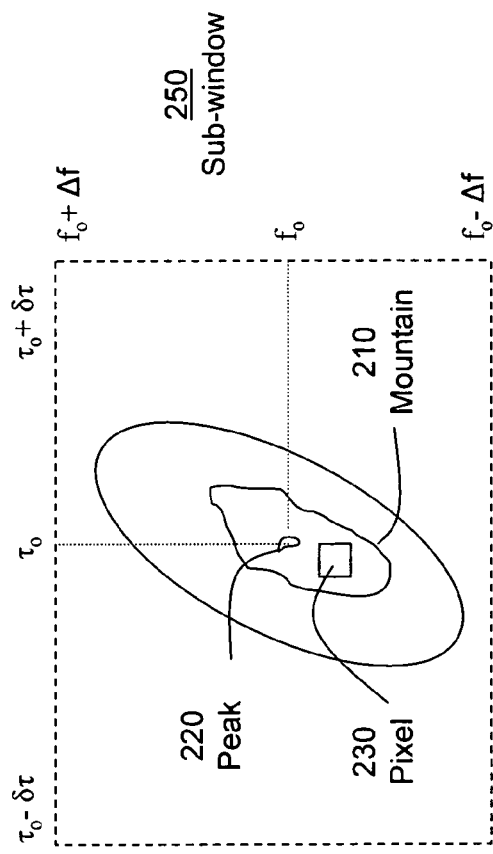
FIG. 3b shows the window about a feature according to one embodiment of the present invention.

In the exploded view of FIG. 3b, the feature 200 is looked at more closely and the peak 220 is centered at some time delay $\tau_0$ and frequency offset $f_0$ where the peak 220 is most likely to be positioned. The size of the sub-window 250 is established as described herein to be sufficiently sized to fully capture an entire feature but small enough to be computationally efficient.

Recall, that every pixel 230 of the image in the sub-window 250 is a correlation between a time shifted and frequency shifted replica of the data. As shown, the CAF surface is not smooth and the peaks are not regular. Rather, the feature 200 has various amplitude attributes or "bumps", because the random nature of data of the mountain is not perfect. The maximum value may not be in the exact location, but the shape in general will indicate the peak position.

Using an autocorrelation, it is possible to compute the ideal shape of the mountain or feature expected, using an unshifted time frequency model sample. This computation would be $h^H(\tau_i f \Delta_j)$. This autocorrelation results in a smooth noise-free mountain peak with the signal being exactly at the center, and will be used as a template to form the masking functions described herein.

Figure 4:
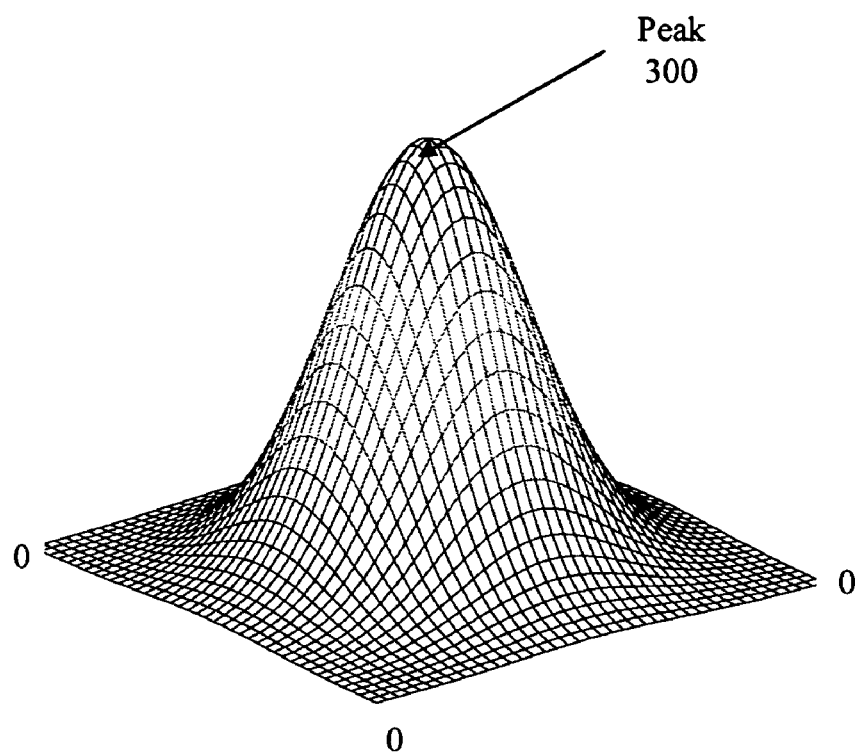
FIG. 4 shows the peak within the feature according to one embodiment of the present invention.
Figure 5:
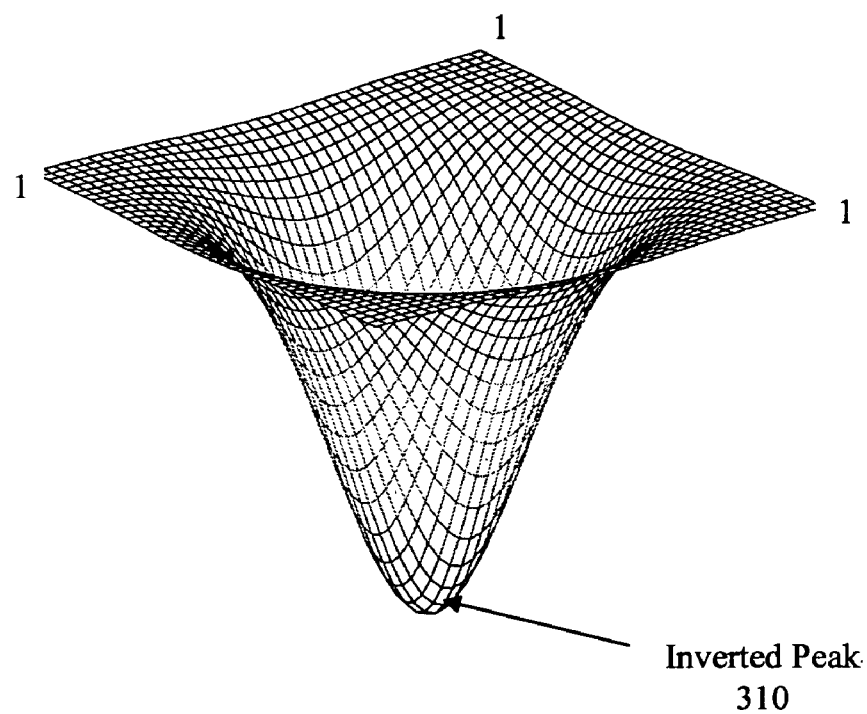
FIG. 5 shows the inverse of the feature according to one embodiment of the present invention.

FIG. 4 and FIG. 5 are used to illustrate the masking functions. A masking function represents what is processed when you analyze the large CAF surface and is a multiplicative relationship to get rid of old peaks that have already been located in order to obtain the data that is to be processed. For example, a masking function of '1' multiplies by 1 each pixel, thereby not changing anything.

FIG. 4 represents the ambiguity function shown in FIG. 3b, except that rather than correlating with the data it correlates the model to shifted versions of the model. The processing shifts the delay and frequency of one image and holds the other at zero delay and zero frequency, and the processing matches them.

In other words, FIG. 4 is similar to FIG. 3b but the peak 300 is located with the time delay $\tau_0$ and frequency offset $f_0$ being centered at 0–the autocorrelation function. After normalization, the peak will be 1 and decay to 0 at the edges provided that the sub-window is sufficiently sized.

However, for the inverted shape such as shown in FIG. 5, the masking function is equal to (1–the autocorrelation function). At the edges there is little or no change, however as you approach the center, with low numbers close to zero, the multiplicative effect wipes out the peaks on the CAF surface and an inverted peak 310 is formed. Thus, the masking flattening function is represented as:

flattening function=(1–autocorrelation), wherein this represents the processing of the matrix of 1's at each point and subtracting off the absolute value of the autocorrelation function.

According to one embodiment, if properly normalized, then the autocorrelation $h^H(\tau_0, f_0) h(\tau, f)$ is 1 at the peak and close to zero where it does not correlate. And, as shown, the flattening function inverses the autocorrelation. Referring again to FIG. 4 and FIG. 5, the inverting feature is illustrated such that the peak 300 becomes an inverted peak 310. When this function is used to multiplicatively alter the CAF surface, the feature under consideration on the CAF is removed, and well as any surrounding values of significant amplitude within the sub-window from further consideration.

There is some region around the peak value that will be used for processing. The region or sub-window is determined by using some known information about the canonical shape for some range of values. This can be represented as follows: $h^H(\tau_0, f_0) h(\tau, f)$, wherein: $h(\tau, f)$ represents the neighborhood.

Figure 6:
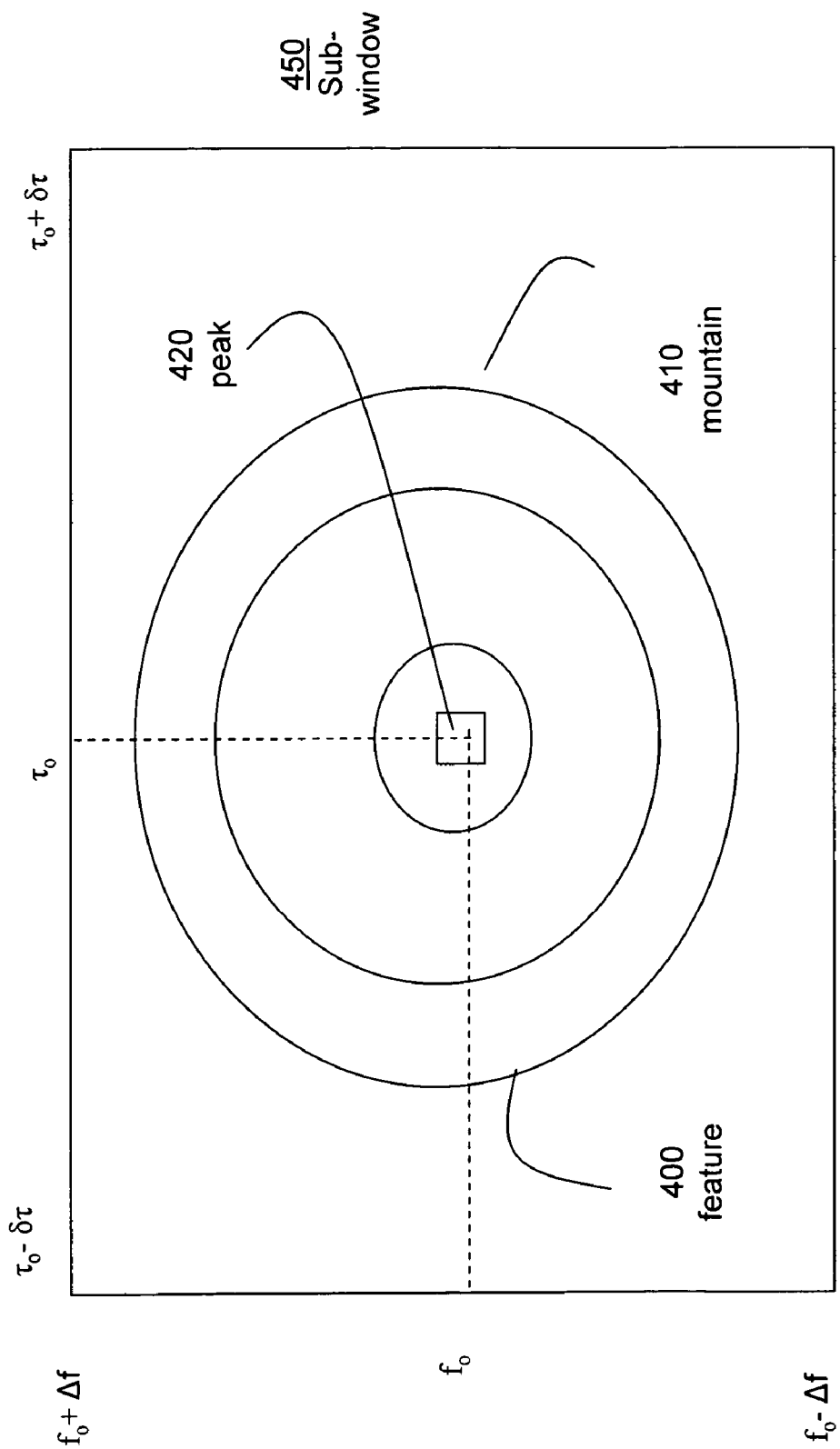
FIG. 6 shows the window relationship according to one embodiment of the present invention.

Referring to FIG. 6, the range or sub-window parameters in frequency and time delay can be established in several ways. According to one embodiment, the sub-window range 450 can be established by fixing the reference signal to some reference point. As shown in FIG. 6, you choose the delta values ($\Delta f$ and $\delta \tau$) from the center point ($\tau_0, f_0$) to be sufficient to cover the contours of the mountain 410 and extend to the zero values near the edges of the sub-window 450.

In certain cases it may require some apriori knowledge of the signals or some empirical testing to ensure that the sub-window 450 is large enough to extend past the coherence time and Doppler extent. In some embodiments the sub-window 450 is warped or modified to ensure it encompasses a sufficient region.

Referring again to FIG. 6, the range for the sub-window 450 around the mountain is illustrated. According to one embodiment, the sub-window range should encompass all the aspects of the mountain 410. The parameters should be large enough so that values along the edge of the autocorrelation function are close to zero. Typically the sub-window 450 may be 30×30 pixels or 40×40 pixels, and should be as small as possible for computational efficiency as the image in the sub-window is subject to the multiplicative processing. However, the sub-window 450 should be sufficiently sized to ensure that the entire mountain 420 is captured. Expressed differently, there should be enough pixels to represent the entire auto-correlation function.

In fields that use the CAF function, coherence time and delay spread can be used as a measure of when things become uncorrelated either in time or frequency. The sub-window 450 should be wide enough to represent all the delays so that you are out past the delay spread or wide enough in frequency so that it is out past the coherence time and things become uncorrelated. For some signals it can be approximated and for other more complex signals, the autocorrelation function can be computed offline to provide sub-window size parameters. In another example, for a Gaussian function, the user may set the sub-window parameters to a 3 sigma point to represent the entire CAF for practical purposes.

Figure 7:
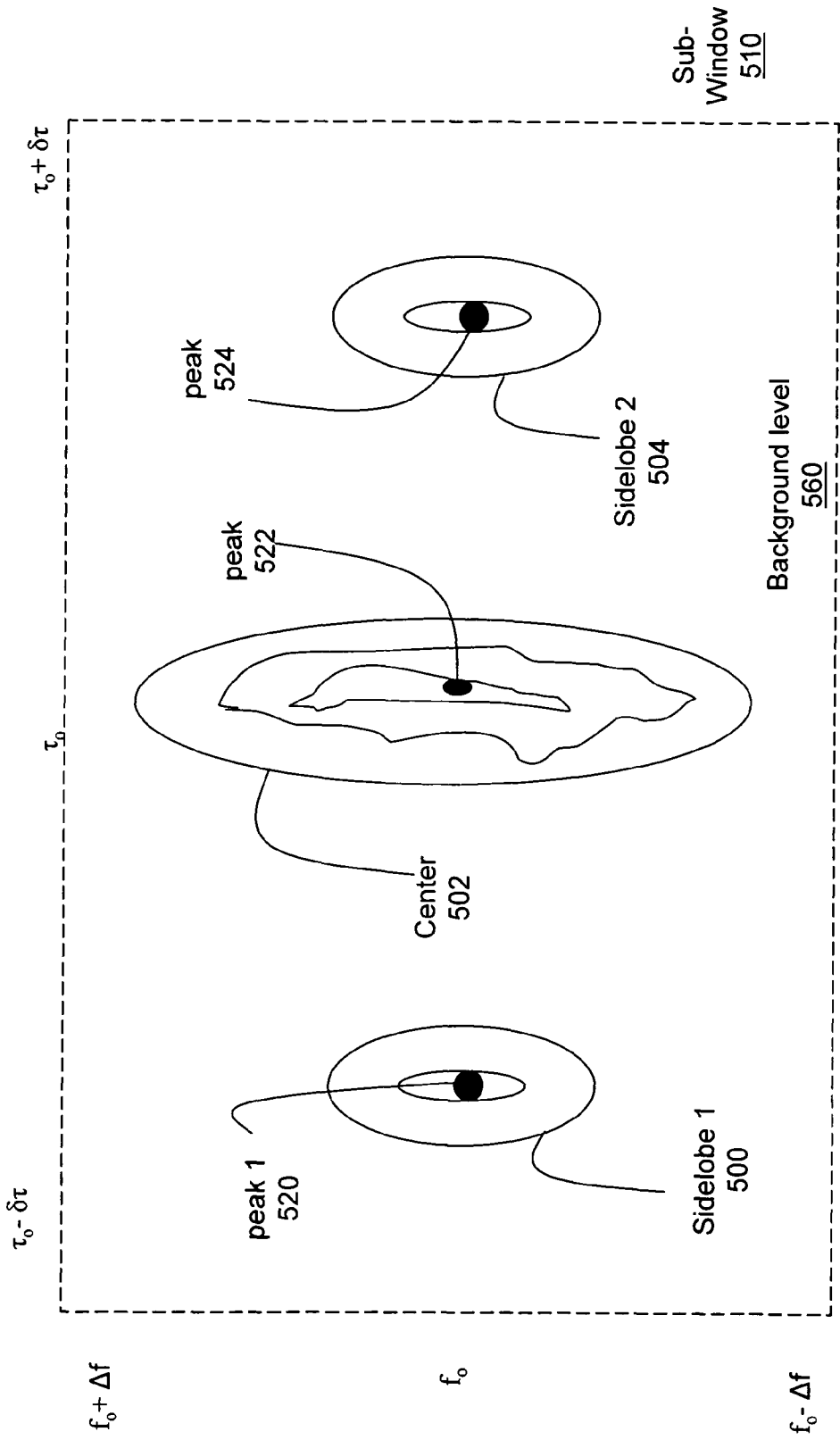
FIG. 7 illustrates multiple peaks in a single window in accordance with one embodiment of the present invention

As shown in FIG. 7, there may be situations where there are multiple features within the sub-window 510 which typically correspond to the signal of interest 502, and sidelobes 500, 504 with each having an associated peak 520, 522, 524. In these situations, the masking function should be designed to cancel all three peaks 520, 522, 524 once the processing of this sub-window 510 is completed. According to one embodiment, this can be done by simply expanding the sub-window of interest 510, and adding the additional cancellation features to the function.

In some situations, when you compute the autocorrelation function there are multiple "bumps" in the sub-window 510. As used herein, the bumps represent some signal power above the background level 560 but somehow related to the same signal or target as opposed to a mountain that represents a different signal or target. FIG. 7 represents a variation of FIG. 4 but with three bumps all belonging to the same signal representative of two pulses turning 'On' and 'Off'. There is a first match at the first sidelobe 500 a second match at a larger amplitude at the center 502 and then a third match at the second sidelobe 504.

In one embodiment the autocorrelation function for FIG. 7 has three bumps and you want to find the peak of interest and cancel all three bumps 500, 502, 504 at the same time. This can be accomplished by expanding the autocorrelation function and sufficiently sizing the sub-window to multiplicatively process the three bumps. By inverting this function such that the sidelobes 500, 504 and center 502 bumps are within the sub-window 510, the first sidelobe peak 520, the center peak 522 and the second sidelobe peak 524 are all eliminated.

In another example, in the situation with three pulses to correlate, the processing incorporates five peaks as there is a first match with a first amplitude; a second match at twice the amplitude; a third with three times the amplitude; a fourth match with twice the amplitude; and finally a fifth match with the first amplitude level.

Figure 8:
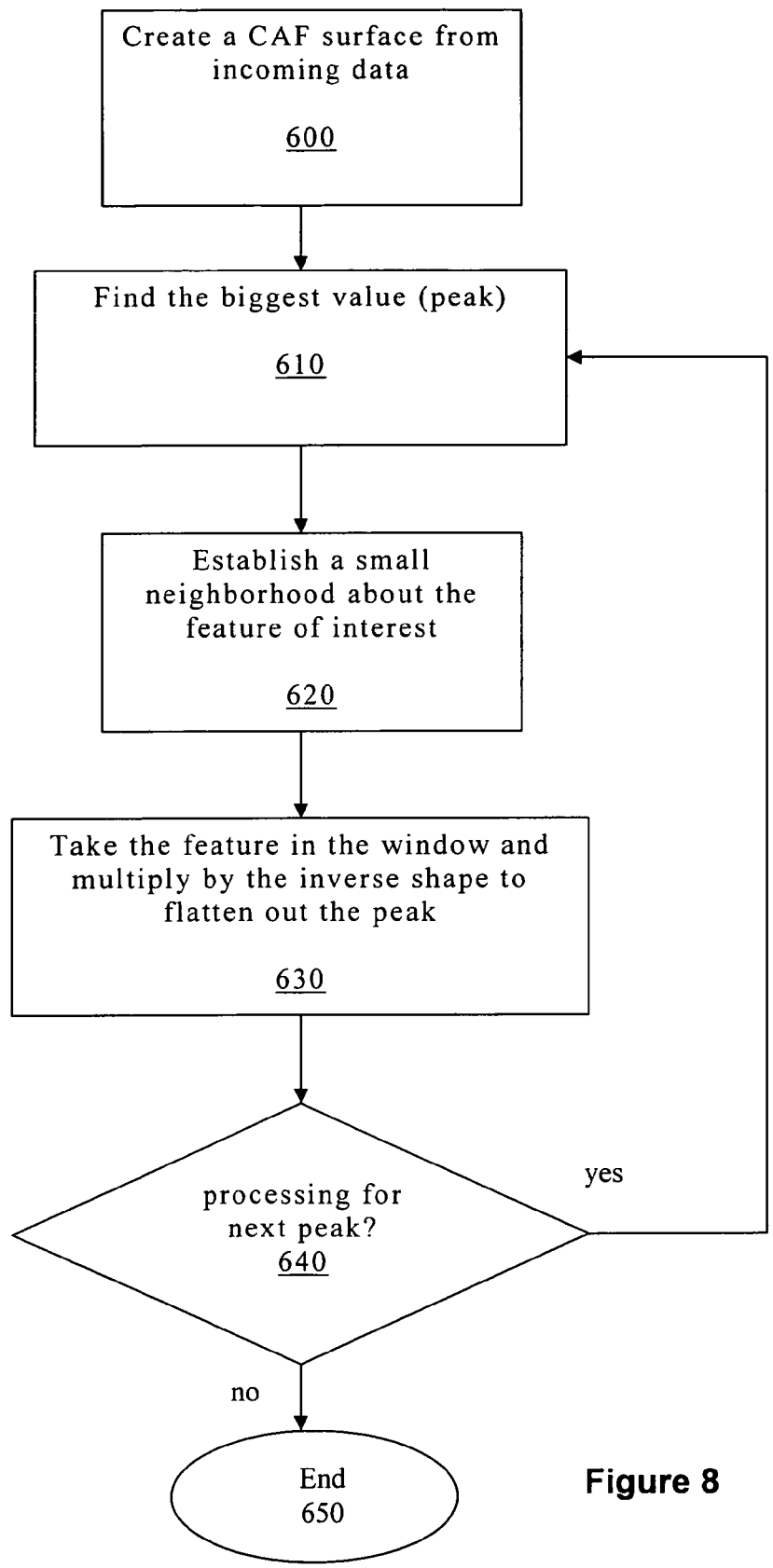
FIG. 8 is a flow chart illustrating the processing according to one embodiment of the present invention.

Referring to FIG. 8, a process flow according to one embodiment is shown. From the incoming data, the CAF surface is generated 600 from some received data that contains some signal information in combination with noise and other signals such that the target or signal of interest is unknown or uncertain. The CAF surface is generated with an array of pixels, and can be quite large.

The next step is to locate a peak in the CAF surface 610. This can be the largest peak on the entire CAF surface or a peak obtained via some other processing technique such as within a region of the CAF surface. For example, the peak can be one or more pixels having an amplitude greater than surrounding pixels and also greater than the background level or noise floor. As noted, there may be more than one pixel with the same peak amplitude.

One embodiment uses some prior canonical knowledge and establishes a small neighborhood of interest or sub-window about the feature of interest having the peak 620. As noted, the sizing of the sub-window should be sufficient to capture sidelobes, if any, and be sized to fully capture the entire features but small enough to allow for efficient processing.

Next, take the feature in the sub-window and multiply by the inverse shape by employing an inverting or flattening function to flatten out the peak. According to one embodiment, this is done incoherently using a real valued function with no phase information 630.

The flattening function in one example can be represented as follows: $f(\tau,f)=1-\int h^H(\tau_0, f_0) h(\tau, f)$, where the point $(\tau_0, f_0)$ is aligned with the currently detected feature. The term $h^H(\tau_0, f_0) h(\tau, f)$ should be recognized as the complex autocorrelation function shifted to the reference point $(\tau_0, f_0)$. In practice this function $f(\tau,f)$ need only be computed once at the points $(\tau,f)$ referenced to $(\tau_0=0, f_0=0)$ and subsequently shifted to the proper location. It should also be readily apparent that the flattening function can be designed by any number of alternate formulations to cancel the feature regardless of the shape or characteristics of the feature. For example, $f(\tau,f)$ may be altered prior to the peak detection and cancellation to cover a larger extent in time or frequency. This would make the processing more robust to unexpected changes in shape of the features.

Processing continues for the next peak value, establishing a sub-window and inverting the feature 640. Commencing in this fashion and looking one by one at peaks, the present invention removes any large values in the CAF surface by using the flattening process.

When finished, the processing ends 650. One method used to determine when the processing is completed and the signal is adequately separated from noise is termed constant false alarm processing (CFAR) processing. The processing generally has some apriori information of statistics of the mountains and surface characteristics outside of the regions which represent some ambient level of bumpiness. Using this estimate of the ambient level, each peak is compared to this ambient level and if it is approximately about the ambient level then the processing is completed. However, this CFAR processing requires taking statistics of the regions outside of the peak even when the location of the peaks is unknown. One method includes finding a peak and disallowing those entries from being in the average of the noise.

Another method is to presume that some margin level, for example the lowest 90%, of all the pixels belong to the noise floor and take statistics with those above that level. This will allow an averaging valuation, and the processing can set a peak value level. For example, make it so that any peak be 3 sigma above that margin level. A further method is to set a user customizable level for the ambient level. For example, the user can set the amount from the ambient such as 2 sigma or 3 sigma A summary of the processing according to one embodiment processes the CAF surface. A one time masking function is calculated, typically offline, as only one version of the masking function is required. On the CAF surface, the peak is located and a region or sub-window around the peak is established which is the extent of the masking function and multiply the CAF surface by the masking function to get rid of that peak.

After you compute the reference function it can involve repeating features such as repeating training data generating repeating features over time. If the signals are complex it may have multiple features separated by frames. For two signals repeating on the CAF surface, the present invention can be implemented in highly complex signals such as signals with multiple sidelobes. In some cases it may be possible to recognize such repeating signals and remove them from the peak selection process.

In one embodiment the present invention also solves a problem in the manner in which data is sampled. The present invention can be used for data that is being sampled at approximately at some multiple of the chip-rate and it is desired to re-sample the data to a lower chip-rate. For example, assume that data that is being sampled at approximately 1.5 times the chip-rate, and it is desired to re-sample the data to 1 times the chip-rate, and process accordingly. The problem with state of the art systems is that delay estimates are required at sub-chip resolution, typically about 10% a chip, to facilitate tracking and amplitude/phase/Doppler estimate.

According to the present invention, the above problem is solved in the following manner, by exploiting the FFT delay property:

$$x[n-T] \leftrightarrow x(w)^* e^{-jwt}$$

By using this property, the estimation and subsequent cancellation of detected features can be accomplished by shifting the masking function to fractional delays. The incoherent feature of the present invention is used with a masking technique to extract multiple pilots each with potentially several multipath components. The use of the algorithm of this invention is described herein.

The CAF surface is computed at the desired over-sampling rate, i.e. CAF (w, T)=$r^H$*S(w, T)

Where $$w \in [w_1 w_1 \ldots w_n]$$

$$T \in [T_1 T_2 \ldots T_m],$$

and S(w, T) is a training signal delayed to 'T' and frequency shifted to w. Note over-sampling in T can be done past convolution as well. One by one the processing picks off peaks of the CAF surface and multiplicatively removes each, to avoid picking the same peak twice. The working surface is thus typically multiplied by bowl shaped, real-valued masking function, and the algorithm proceeds to the next peak.

According to one embodiment, at detected peak locations, complex amplitudes (amplitude and carrier phase) are calculated by:

a) matched filter (one basis function)

$$ai = \frac{Si_-^H(w, T)}{|(Si(w, T)|} * r$$

b) or MLE (several basis functions)

$$a = ([Si(w, T) \ldots S_k(w, T)]^{H*}S)^{-1} S^H r$$

Those skilled in the art will appreciate that here, $S_i$ is sampled at the same rate as the data, and therefore, $T_1$ need not be commensurate with this sampling rate. That is, just use the FFT delay property to compute the shifted signal. By design of the masking function, replicas S($w_i$ $T_i$) will never be close enough to cause instabilities in $(S^H S)^{-1}$.

As noted, one of the applications for the processing of the present invention is in Range Doppler processing of sonar/radar wherein the signal processing looks for returns of signals and noise where there is uncertainty as to when the signal returns are arriving or what frequency shift the received signals will have.

The present invention also has applications in communication signal processing wherein certain sequence or waveform may be precursor to the rest of the incoming signal. Any wireless communication or wireless network that uses a training sequence or preamble that may be shifted in frequency cause things are moving and you are faced with computing the entire CAF surface which is computationally difficult, and the present invention provides a way to avoid re-computing it all the time thereby requiring less computer resources and less time for processing.

One of the benefits of the present invention is that it provides an efficient mechanism to accurately identify the distinct signals. For example, to search a CAF function for 10 peaks or signals may result in improper processing of a pixel value that is proximate a dominant peak. Around any peak are a number of pixels with values that may be 'higher' than the peak from another signal. In such a scenario, the other signal may be missed and the processing of an incorrect signal will occur with no additional information. In one embodiment, once you found a peak or highest value on the mountain, you can remove every other single elevation of that mountain that can get be inadvertently processed.

Other examples that may incorporate the present invention include radar systems. Radars such as pulsed radar and continuous wave radar are typically used to detect targets by processing received signals. In pulsed radar, the measure of target distance is determined by the measurement of the time elapsed from the transmission of an electromagnetic energy pulse to the reception of its reflected energy. In continuous wave radar, a continuous wave is transmitted. The target distance is determined through the measurement of the frequency shift between the transmitted signal and the received reflected signal. Conventional radar systems transmit electromagnetic energy. A portion of the transmitted electromagnetic energy is reflected off a target of interest and scattered in the space. The radar system receives the reflected energy and extracts the information about the target of interest by correlating the received reflected energy with replicas of the transmitted energy. Such systems can benefit from the CAF processing techniques described herein.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for processing a complex ambiguity function (CAF) surface comprising:
   providing incoming data to a processing unit;
   providing a model vector to the processing unit;
   creating by the processing unit of a CAF surface from the incoming data and the model vector, wherein said CAF surface has at least one feature;
   processing of said CAF surface by the processing unit so as to locate a peak on said CAF surface;
   establishing by the processing unit of a sub-window about said peak, wherein said peak is within said sub-window; and
   flattening by the processing unit of said peak.

2. The method according to claim 1, further comprising:
   processing of said CAF surface by the processing unit so as to locate a next peak;
   establishing by the processing unit a next sub-window about said next peak; and
   flattening by the processing unit of said next peak.

3. The method according to claim 1, wherein said flattening is accomplished by a flattening function defined by performing an autocorrelation of the model vector and inversing the autocorrelation.

4. The method according to claim 1, wherein said sub-window is a range about the feature such that said sub-window includes sufficient pixels to represent an entire autocorrelation function.

5. The method according to claim 1, wherein said sub-window is represented as: $h^H(\tau_0, f_0)$ $h(\tau, f)$, wherein: $h(\tau, f)$ represents a neighborhood.

6. The method according to claim 1, wherein said feature contains a plurality of two dimensional pixels having some time delay and frequency offset.

7. The method according to claim 1, wherein said peak occupies at least one pixel and represents an area on the CAF surface of increased amplitude.

8. The method according to claim 1, wherein said flattening includes application by the processor of a flattening function, wherein computation of said flattening function further comprises centering said peak in said sub-window, performing an autocorrelation function, and inverting said feature.

9. The method according to claim 1, wherein said flattening function is represented by: $f(\tau,f)=1-\int h^{H}(\tau_0, f_0) h(\tau, f)$.

10. The method according to claim 1, wherein said processing continues until a condition is satisfied according to one of a group consisting of: constant false alarm processing; setting a margin level; and setting a customizable level.

11. A system for processing a complex ambiguity function (CAF) surface comprising a processing unit, and software operable on the processing unit, the software being configured to cause the processing unit to:
generate a pixel array CAF surface from incoming data, wherein said CAF surface has at least one feature and at least one peak;
find at least one pixel representing said at least one peak on said CAF surface, wherein said peak has an amplitude greater than a background level;
frame a sub-window around said peak, wherein said sub-window includes said peak; and
apply a flattening function to said feature in said sub-window.

12. The system according to claim 11, wherein said flattening function cancels at least one said peak.

13. The system according to claim 11, wherein said flattening function is represented as: flattening function=(1−autocorrelation).

14. The system according to claim 11, wherein said sub-window is sized so that pixel values along an edge of the autocorrelation function are about approximately zero.

15. The system according to claim 11, wherein the software is configured to cause the processing unit to continue finding, framing, and applying until a condition is satisfied according to one of a group consisting of: constant false alarm processing; setting a margin level; and setting a customizable level.

16. A method for high resolution processing of a CAF surface, the method comprising:
Computing by a processing unit a CAF surface of an array of pixels at a desired over-sampling rate;
Locating by the processing unit of a peak on said CAF surface;
Forming by the processing unit of a sub-window about said peak;
multiplicatively removing by the processing unit of said peak using fractional delays; and
repeating by the processing unit of said steps of locating a next peak and multiplicatively removing each said next peak.

17. The method according to claim 16, wherein said peak is calculated by at least one of a matched filter section and a maximum likelihood estimation (MLE) section.

18. The method according to claim 16, wherein said CAF surface is computed at the desired over-sampling rate by CAF $(w, T)=r^{H}*S(w, T)$.

19. The method according to claim 16, wherein a size of said sub-window is selected from a group consisting of: fixing a reference signal to a reference point; empirical testing so said sub-window extends past a coherence time and a Doppler extent; using a priori knowledge so said sub-window extends past a coherence time and a Doppler extent; warping said window to ensure it encompasses a sufficient region; and using a priori information about a canonical shape for some range of values.

20. The method according to claim 16, wherein said sub-window is a range about the peak such that said sub-window includes sufficient pixels to represent an entire autocorrelation function.

* * * * *